US009421867B2

(12) United States Patent
Sakurai et al.

(10) Patent No.: US 9,421,867 B2
(45) Date of Patent: Aug. 23, 2016

(54) ELECTRIC VEHICLE

(71) Applicant: HONDA MOTOR CO., LTD., Tokyo (JP)

(72) Inventors: Takeshi Sakurai, Utsunomiya (JP); Hiroyuki Kanazawa, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 347 days.

(21) Appl. No.: 13/732,663

(22) Filed: Jan. 2, 2013

(65) Prior Publication Data

US 2013/0175858 A1   Jul. 11, 2013

(30) Foreign Application Priority Data

Jan. 10, 2012  (JP) .................................. 2012-002102

(51) Int. Cl.
*B60R 16/03*  (2006.01)
*B60L 1/00*  (2006.01)
(Continued)

(52) U.S. Cl.
CPC .............. *B60L 1/00* (2013.01); *B60L 11/1812* (2013.01); *B60L 11/1816* (2013.01); *B60L 11/1868* (2013.01); *B60L 15/2045* (2013.01); *B60R 16/03* (2013.01); *B60L 2210/12* (2013.01); *B60L 2240/526* (2013.01); *B60L 2240/529* (2013.01); *Y02T 10/645* (2013.01); *Y02T 10/7005* (2013.01); *Y02T 10/7066* (2013.01);
(Continued)

(58) Field of Classification Search
CPC ............. B60L 11/18; B60K 1/64; H02J 7/14; H02J 7/00; H02J 7/34; H01M 2/10; H02M 1/14; H03H 7/00; H02P 5/00
USPC ......................................................... 307/9.1
See application file for complete search history.

(56) References Cited

U.S. PATENT DOCUMENTS

2008/0224663 A1*  9/2008  Mack ..................... B60K 6/445
                                                  320/132
2008/0278123 A1   11/2008  Mehas et al.
(Continued)

FOREIGN PATENT DOCUMENTS

CN         1785707 A      6/2006
CN       101966841 A      2/2011
(Continued)

OTHER PUBLICATIONS

Chinese Office Action application No. 201210580071.4 issued Oct. 24, 2014.
(Continued)

*Primary Examiner* — Thienvu Tran
*Assistant Examiner* — David M Stables
(74) *Attorney, Agent, or Firm* — Squire Patton Boggs (US) LLP

(57) ABSTRACT

An output current of a DC/DC converter which serves as a step-down device for charging the low-voltage electric storage device is detected. Based on the detected output current and the efficiency of the DC/DC converter, the electric power consumed by an auxiliary equipment load that is connected parallel to the low-voltage electric storage device is controlled to make the efficiency of the DC/DC converter equal to or greater than a prescribed efficiency, so that the low-voltage electric storage device can be charged from a high-voltage electric storage device or an external power supply.

5 Claims, 6 Drawing Sheets

(51) Int. Cl.
  *B60L 11/18* (2006.01)
  *B60L 15/20* (2006.01)
(52) U.S. Cl.
  CPC .......... *Y02T10/7072* (2013.01); *Y02T 10/7233* (2013.01); *Y02T 10/7283* (2013.01); *Y02T 90/127* (2013.01); *Y02T 90/14* (2013.01)

(56) References Cited

U.S. PATENT DOCUMENTS

| 2009/0145674 | A1* | 6/2009 | Lee | B60K 6/405 180/65.1 |
|---|---|---|---|---|
| 2009/0206660 | A1* | 8/2009 | Makita | H02J 7/1423 307/9.1 |
| 2011/0068740 | A1 | 3/2011 | Ang | |
| 2011/0187184 | A1 | 8/2011 | Ichikawa | |
| 2012/0306263 | A1 | 12/2012 | Tashiro et al. | |
| 2013/0134908 | A1 | 5/2013 | Sugiyama et al. | |

FOREIGN PATENT DOCUMENTS

| JP | 2002218646 A | 8/2002 |
|---|---|---|
| JP | 2005-245086 A | 9/2005 |
| JP | 2009-254212 A | 10/2009 |
| JP | 2009284649 A | 12/2009 |
| JP | 2011-055682 A | 3/2011 |
| JP | 2011-223834 A | 11/2011 |
| JP | 2012-249462 A | 12/2012 |

OTHER PUBLICATIONS

Japanese Patent Office, Japanese Office Action, with partial English translation, for corresponding Japanese Patent Application No. 2012-267052, dated Sep. 1, 2015.
German Patent and Trademark Office, Search Report for corresponding German Patent Appln. No. 10 2013 200 133.9, Oct. 22, 2015.
German Patent and Trademark Office, Office Action for corresponding German Patent Appln. No. 10 2013 200 133.9, Oct. 22, 2015.

* cited by examiner

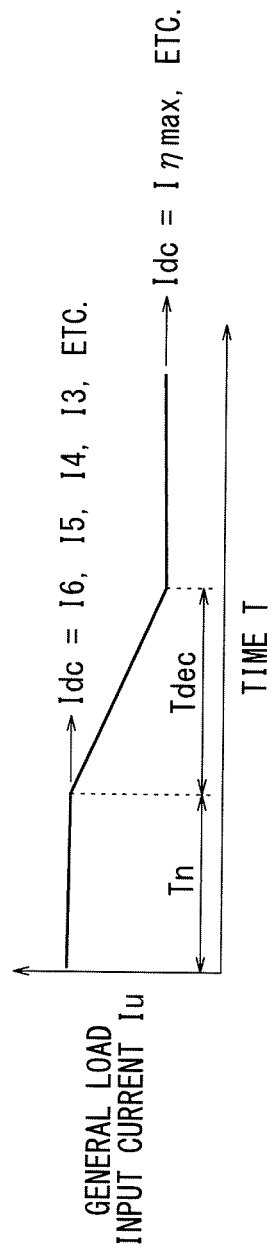

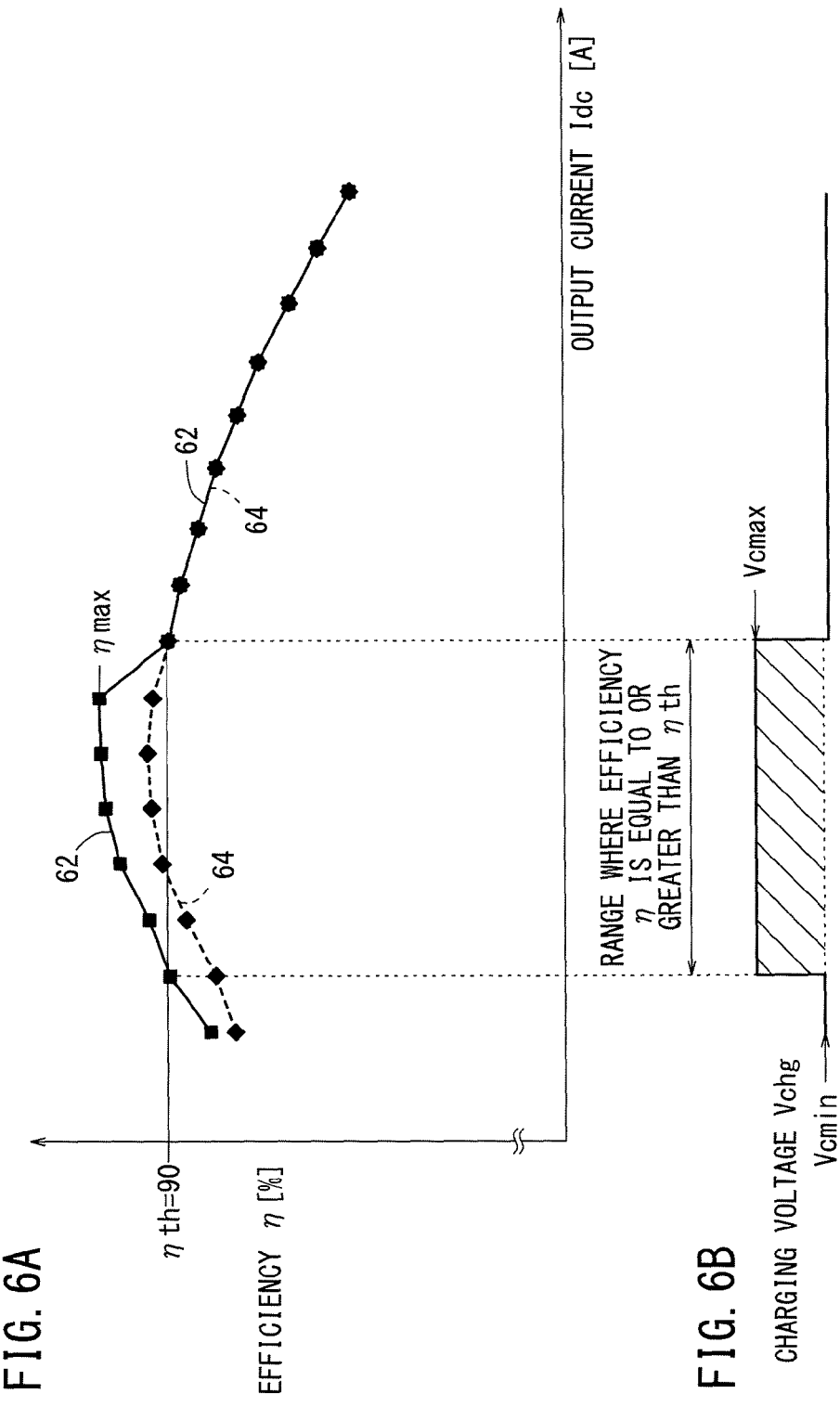

ELECTRIC VEHICLE

CROSS-REFERENCE TO RELATED APPLICATION

This application is based upon and claims the benefit of priority from Japanese Patent Applications No. 2012-002102 filed on Jan. 10, 2012, the contents of which are incorporated herein by reference.

BACKGROUND OF THE INVENTION

1. Field of the Invention

The present invention relates to an electric vehicle having an electric motor, a high-voltage electric storage device for energizing at least the electric motor, a step-down device for lowering the voltage of the high-voltage electric storage device, and a step-down device controller for controlling the output current of the step-down device.

2. Description of the Related Art

Heretofore, there has been disclosed a technology for charging a low-voltage auxiliary battery which energizes a low-voltage load on an electric vehicle from a high-voltage battery by connecting a high-capacity main DC/DC converter and a low-capacity auxiliary DC/DC converter, which are of different capacities, to the high-voltage battery and charging the low-voltage auxiliary battery using the main DC/DC converter or the auxiliary DC/DC converter depending on the situation (see Japanese Laid-Open Patent Publication No. 2011-055682 (hereinafter referred to as "JP2011-055682A"), FIG. 2).

SUMMARY OF THE INVENTION

JP2011-055682A shows that when the electric vehicle is at rest, the auxiliary battery is charged using only the low-capacity auxiliary DC/DC converter, and when the electric vehicle is running, the low-capacity auxiliary DC/DC converter and the high-capacity main DC/DC converter are selectively used to charge the auxiliary battery, so that the auxiliary battery can be charged efficiently (see paragraphs [0036], [0037], and [0053] of JP2011-055682A).

However, the electric vehicle according to the related art needs to install a plurality of DC/DC converters, which tend to cause an increase in the cost and result in a complex circuit arrangement.

It is an object of the present invention to provide an electric vehicle which is capable of charging a low-voltage electric storage device highly efficiently from a high-voltage electric storage device or an external power supply with an inexpensive and simple arrangement.

According to the present invention, there is provided an electric vehicle having an electric motor and a high-voltage electric storage device for energizing at least the electric motor, comprising a low-voltage electric storage device for energizing an auxiliary equipment load of the electric vehicle, a step-down device connected between the high-voltage electric storage device and the low-voltage electric storage device for lowering the voltage of the high-voltage electric storage device to supply electric power to the low-voltage electric storage device, the auxiliary equipment load connected to a low-voltage terminal of the step-down device and connected parallel to the low-voltage electric storage device, an output current detector and a step-down device controller for controlling the electric power consumed by the auxiliary equipment load to control the output current from the step-down device so that efficiency of the step-down device which is determined from the output current will become equal to or greater than a prescribed efficiency.

According to the present invention, the output current of the step-down device for charging the low-voltage electric storage device is detected. Based on the detected output current and the efficiency of the step-down device, the electric power consumed by the auxiliary equipment load that is connected parallel to the low-voltage electric storage device is controlled to make the efficiency of the step-down device equal to or greater than the prescribed efficiency. Therefore, the single step-down device is used, and the low-voltage electric storage device can be charged highly efficiently from the high-voltage electric storage device or an external power supply with an inexpensive and simple arrangement.

The efficiency of the step-down device may have characteristics such that the efficiency drops as at least the output current from the step-down device increases, and the step-down device controller may control the electric power consumed by the auxiliary equipment load by energizing the auxiliary equipment load for a shorter period of time as the output current increases. The step-down device can thus be used highly efficiently.

The electric vehicle may further comprise an electric storage device temperature detector for detecting a temperature of the low-voltage electric storage device, and the step-down device controller may charge the low-voltage electric storage device by increasing an output voltage of the step-down device as the temperature of the low-voltage electric storage device lowers when the efficiency of the step-down device is equal to or greater than the prescribed efficiency and the temperature of the low-voltage electric storage device is lower than a prescribed temperature. Therefore, the low-voltage electric storage device can be charged to an appropriate amount of electric energy depending on the temperature thereof.

The electric vehicle may further comprise a charger connected between the high-voltage electric storage device and the step-down device, for charging both the high-voltage electric storage device and the low-voltage electric storage device from an external power supply, and the step-down device controller may calculate an amount of electric energy stored in the low-voltage electric storage device and stop operating the step-down device when the calculated amount of electric energy is equal to or greater than a prescribed amount. Therefore, when the amount of electric energy stored in the low-voltage electric storage device is equal to or greater than the prescribed amount, the charger can charge the high-voltage electric storage device intensively.

According to the present invention, the output current of the step-down device for charging the low-voltage electric storage device (auxiliary equipment battery) is detected. Based on the detected output current and the efficiency of the step-down device, the electric power consumed by the auxiliary equipment load that is connected parallel to the low-voltage electric storage device (auxiliary equipment battery) is controlled to make the efficiency of the step-down device equal to or greater than the prescribed efficiency. Therefore, the low-voltage electric storage device can be charged highly efficiently from the high-voltage electric storage device or the external power supply.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram showing a control process for limiting an input current supplied to a general load;

FIG. 6A is a diagram showing characteristic curves representative of efficiencies of a DC/DC converter with respect to output currents thereof; and FIG. 6B is a diagram showing efficiencies vs. charging voltages.

DESCRIPTION OF THE PREFERRED EMBODIMENTS

An electric vehicle according to an embodiment of the present invention will be described below with reference to the drawings.

Figure 1:
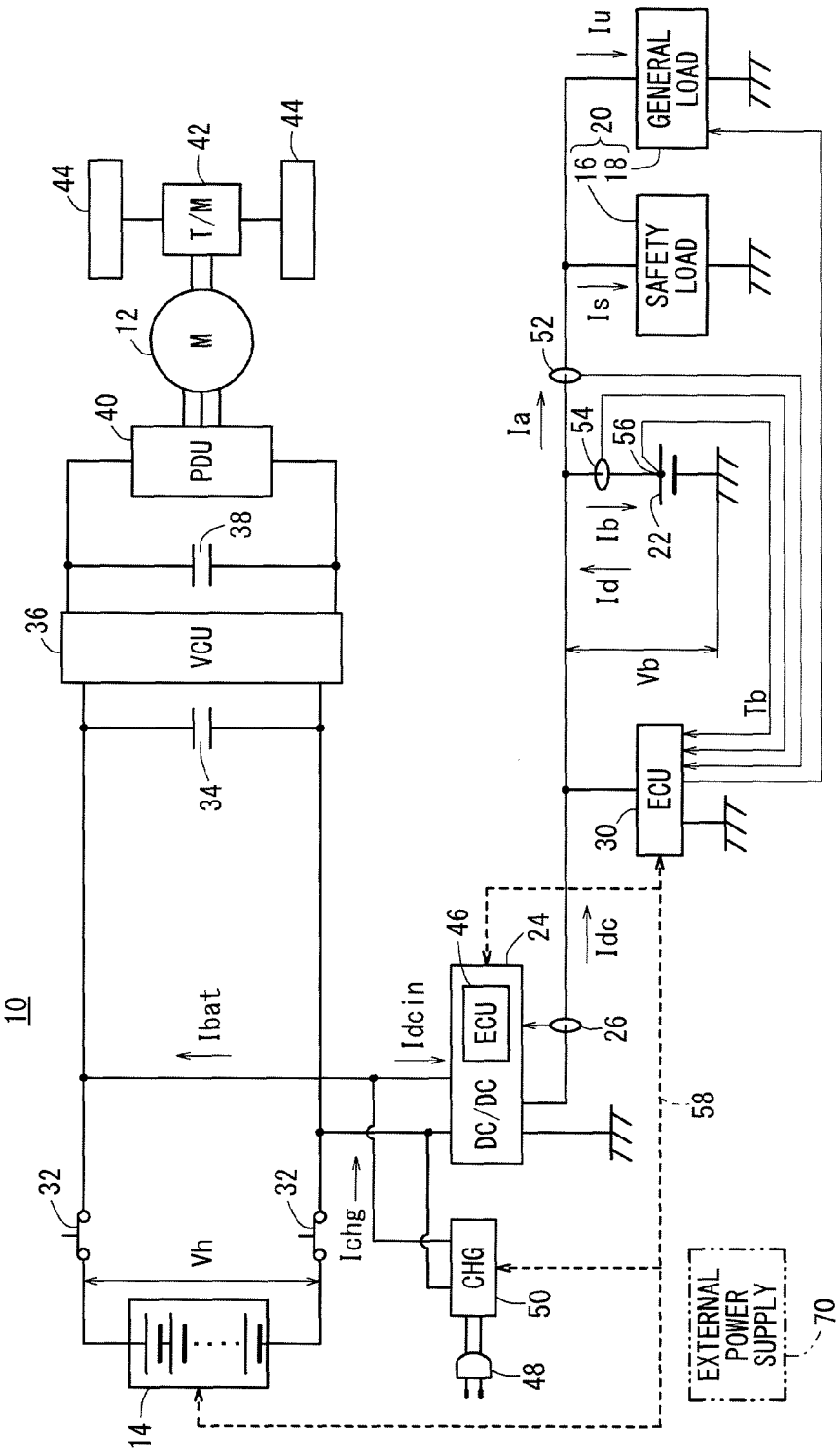
FIG. 1 is a block diagram of an electric vehicle according to an embodiment of the present invention.

FIG. 1 shows in block form an electric vehicle 10 according to an embodiment of the present invention.

As shown in FIG. 1, the electric vehicle 10 according to the present embodiment basically comprises an electric motor (traction motor) 12 which serves as a main load, a high-voltage electric storage device 14 for generating a high DC voltage Vh to supply electric power for energizing the electric motor 12, an auxiliary (accessory) equipment load 20 including a safety load 16 and a general load 18, a low-voltage electric storage device 22 for generating a low DC voltage Vb to supply electric power for energizing the auxiliary equipment load 20, a DC/DC converter 24 connected between the high-voltage electric storage device 14 and the low-voltage electric storage device 22 and serving as a step-down device for lowering the high DC voltage Vh of the high-voltage electric storage device 14 into the low DC voltage Vb to supply electric power to the low-voltage electric storage device (auxiliary battery) 22, a current sensor 26 serving as an output current detector for detecting an output current Idc from the DC/DC converter 24, and an ECU (Electronic Control Unit) 30 serving as a step-down device controller for controlling (setting) the output current Idc from the DC/DC converter 24, etc.

As described later, the DC/DC converter 24 lowers the high-voltage DC voltage Vh (charging voltage), which is generated from a power supply (external power supply) 70 external to the electric vehicle 10 through a charger 50, into the low DC voltage Vb to supply charging electric power to the low-voltage electric storage device 22.

The DC/DC converter 24, which comprises a chopper-type down converter, includes a main DC/DC converter unit, a drive circuit, not shown, for energizing the main DC/DC converter unit, and an ECU 46 serving as a DC/DC converter controller for controlling the main DC/DC converter unit through the drive circuit.

Each of the ECU 46 and the ECU 30 comprises a computer which may be a microcomputer, and has a CPU (Central Processing Unit), a ROM (Read Only Memory) which may be an EEPROM (Electrically Erasable Programmable Read Only Memory), a RAM (Random Access Memory), input/output devices including an A/D converter, a D/A converter, etc., and a timer as a time measuring unit. The computer functions as various function performing sections (function performing means), e.g., a controller, an arithmetic section, a processor, etc. when the CPU reads and executes programs stored in the ROM.

Between the high-voltage electric storage device 14 and the electric motor 12, there are connected a switch 32, a smoothing capacitor 34, a VCU (Voltage Control Unit) 36, a smoothing capacitor 38, and a PDU (Power Drive Unit) 40 functioning as an inverter.

The high-voltage electric storage device 14 comprises an energy storage device which may be a secondary battery such as a lithium ion secondary battery, a nickel hydrogen secondary battery, or the like, or a capacitor or the like. According to the present embodiment, the high-voltage electric storage device 14 comprises a lithium ion secondary battery. The high DC voltage Vh generated by the high-voltage electric storage device 14 is converted into a higher DC voltage by the VCU 36, which serves as a bidirectional DC/DC converter. The higher DC voltage generated by the VCU 36 is converted by the PDU 40 into a three-phase AC voltage as a drive signal, which is applied to energize the electric motor 12.

When the electric motor 12 is energized, it generates a rotational torque that is transmitted through a transmission (T/M) 42 to road wheels 44 of the electric vehicle 10.

When the electric motor 12 operates in a regenerative mode, e.g., at the time the electric vehicle 10 runs downhill, the electric motor 12 functions as an electric generator to produce regenerative electric power. In the regenerative mode, the regenerative electric power produced by the electric motor 12 is supplied through the PDU 40 and the VCU 36 to the high-voltage electric storage device 14, charging the high-voltage electric storage device 14. Excessive regenerative electric power from the electric motor 12 is supplied through the DC/DC converter 24 to charge the low-voltage electric storage device 22.

According to the present embodiment, the low-voltage electric storage device 22 comprises a lead storage battery (lead battery) having a rated voltage of +12 [V].

Between the high-voltage electric storage device 14 and the DC/DC converter 24, there is connected the charger (CHG) 50 having a charging plug 48 that is connected to the external power supply 70. The charger 50 converts the voltage of AC electric power supplied from the external power supply 70 into the high DC voltage Vh which is applied to charge the high-voltage electric storage device 14 and also to charge the low-voltage electric storage device 22 through the DC/DC converter 24.

In FIG. 1, a charging current Ichg output from the charger 50 is divided into a charging current Ibat for being supplied to the high-voltage electric storage device 14 and an input current Idcin for being input to the DC/DC converter 24. An output current Idc from the DC/DC converter 24 is divided into a charging current Ib for being supplied to the low-voltage electric storage device 22 and an input current Ia for being input to the auxiliary equipment load 20.

The value of the output current Idc from the DC/DC converter 24 is detected by the current sensor 26 that serves as an output current detector, and supplied to the ECU 30 which controls a low-voltage load, etc.

The value of the input current Ia for being input to the auxiliary equipment load 20 is detected by a current sensor 52 as a current sensor. The value of the charging current Ib which is supplied to the low-voltage electric storage device 22 and the value of a discharging current Id output from the low-voltage electric storage device 22 are detected by a current sensor 54 as a current detector. The value of the temperature Tb of the low-voltage electric storage device 22 is detected by a temperature sensor 56 as a temperature detector. The detected values are supplied to the ECU 30.

The ECU 30 also functions as a voltage detector (voltage sensor) for detecting the DC voltage Vb across the low-voltage electric storage device 22. The ECU 30 monitors the DC voltage Vb, the input current (charging current) Ib, the output current (discharging current) Id, and the temperature Tb at all times thereby to detect an SOC (State Of Charge) which is representative of the amount of electric energy stored in the low-voltage electric storage device 22.

The safety load 16 refers to loads concerned with the safety of the electric vehicle 10, including headlights, a brake system, etc., and the general load 18 refers to loads concerned with the passenger's comfort in the electric vehicle 10, including an audio system, an air conditioner, passenger compartment lamps, etc. Electric power consumed by the general load 18, or an input current Iu supplied to the general load 18, can be adjusted or controlled by the ECU 30.

The ECU 30 is capable of bidirectionally communicating with the ECU 46 of the DC/DC converter 24, an ECU, not shown, of the charger 50, and an ECU, not shown, of the high-voltage electric storage device 14 via vehicle-mounted communication lines 58, shown by the broken lines, such as of a CAN (Controller Area Network) or the like.

The electric vehicle 10 according to the present embodiment is basically constructed as described above. An operation sequence of essential components of the electric vehicle 10 will be described below with reference to a flowchart shown in FIG. 2, which is executed by the ECU 30 that serves as a step-down device controller. The present invention is applicable when the electric vehicle 10 is traveling, when the electric vehicle 10 stops idling, and when either one or both of the high-voltage electric storage device 14 and the low-voltage electric storage device 22 are charged from the external power supply 70 through the charger 50. However, the operation of the electric vehicle 10 to charge the low-voltage electric storage device 22 quickly with high efficiency from the external power supply 70 through the charger 50 connected thereto will mainly be described below.

Figure 2:
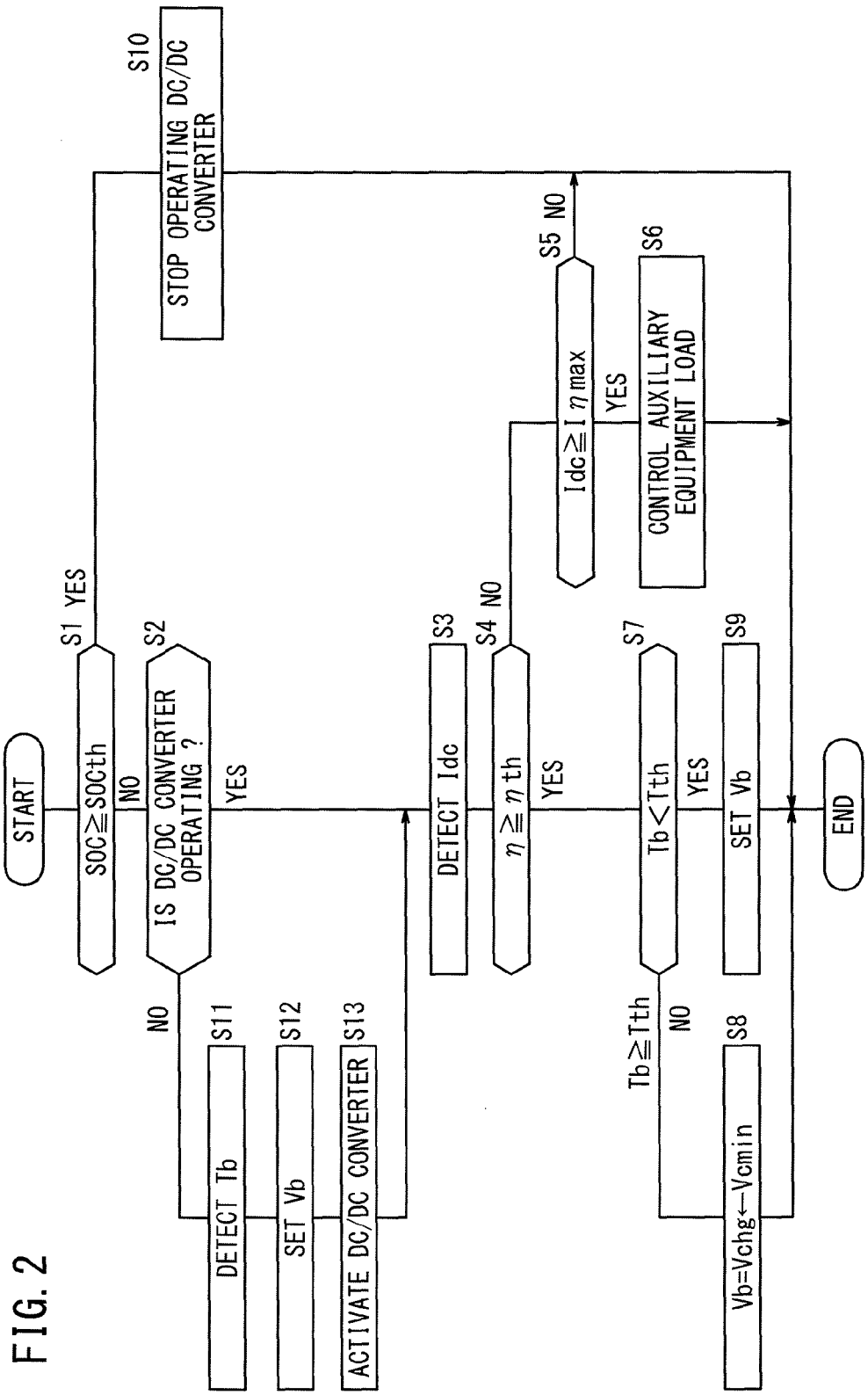
FIG. 2 is a flowchart of an operation sequence of essential components of the electric vehicle.

In step S1 shown in FIG. 2, the ECU 30 judges whether or not the SOC of the low-voltage electric storage device 22 is equal to or greater than a threshold value SOCth, e.g., indicates a fully charged state or a nearly fully charge state. If the SOC of the low-voltage electric storage device 22 is smaller than the threshold value SOCth (step S1: NO), then the ECU 30 judges, through the ECU 46, whether the DC/DC converter 24 is operating or not, i.e., its switching elements are switching or not in step S2. If the DC/DC converter 24 is operating (step S2: YES), then the ECU 30 detects the value of the output current Idc of the DC/DC converter 24 through the current sensor 26 and the ECU 46 in step S3.

In step S4, the ECU 30 judges based on the detected value of the output current Idc whether or not the efficiency η of the DC/DC converter 24 is equal to or greater than a threshold efficiency ηth, e.g., 90 [%], that is representative of a level at or above which the efficiency η is judged as good.

Figures 3A, 3B:
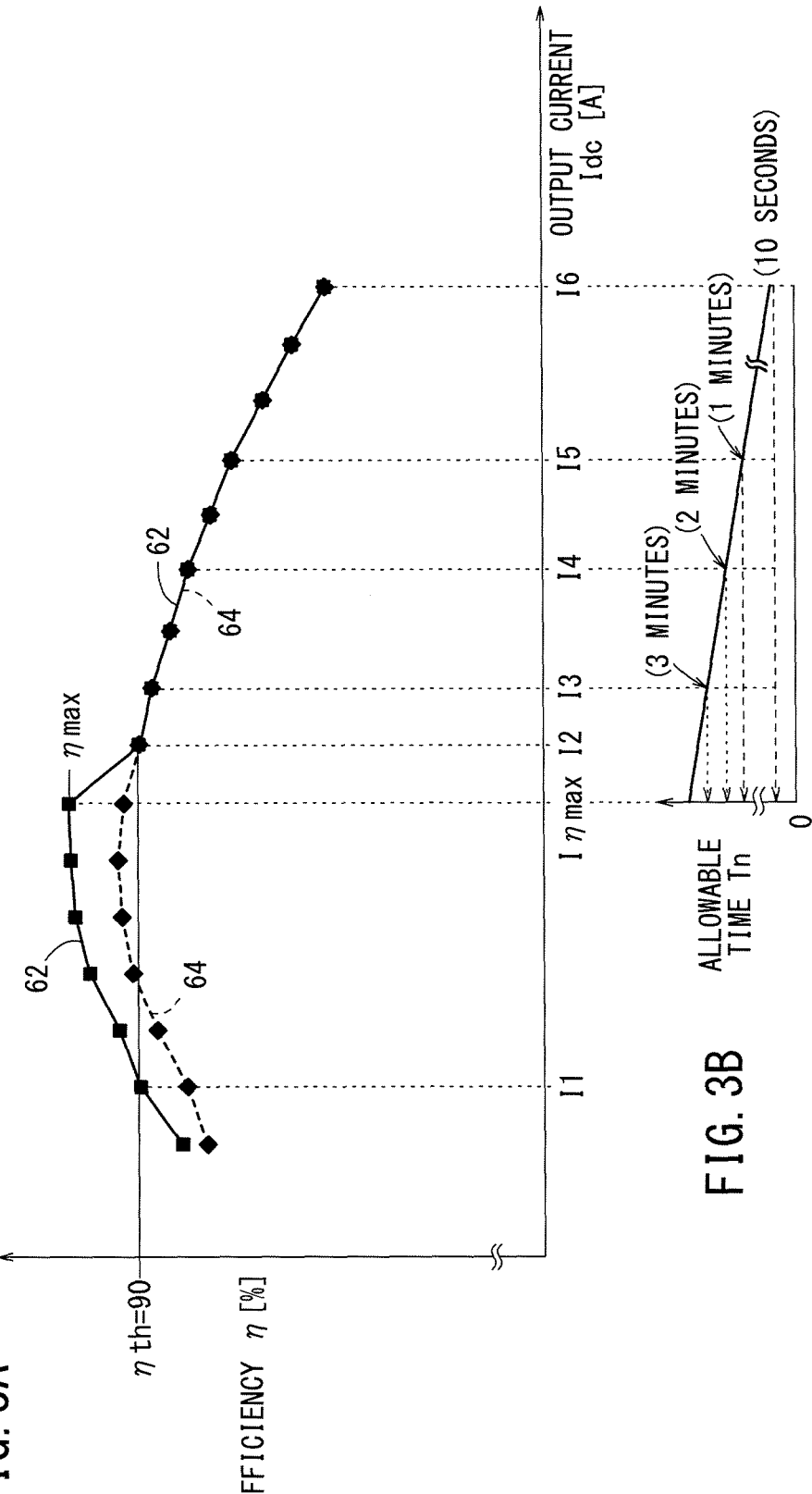
FIG. 3A is a diagram showing characteristic curves representative of efficiencies of a DC/DC converter with respect to output currents thereof.
FIG. 3B is a diagram showing allowable times with respect to the output currents.

The relationship between the efficiency η of the DC/DC converter 24 and the output current Idc is measured or established in advance, and stored as a characteristic curve 62 shown in FIG. 3A in a memory (storage) of the ECU 30.

FIG. 3A shows the characteristic curve 62 and a normal characteristic curve 64 in a graph having a horizontal axis representing the output current Idc [A] and a vertical axis representing the efficiency η [%] of the DC/DC converter 24. In a region where the output current Idc is smaller than an output current I2, the switching frequency of the DC/DC converter 24 is increased, and the DC/DC converter 24 is used according to the characteristic curve 62, indicated as a solid-line curve, which is established for higher efficiency than the normal characteristic curve 64, indicated as a broken-line curve. According to the present embodiment, the solid-line characteristic curve 62 is used.

The efficiency η which is equal to or higher than the threshold efficiency ηth (90 [%] in FIG. 3A) is obtained in a relatively low current range from an output current I1 to the output current I2. A maximum efficiency ηmax is achieved at an output current Iηmax. For example, the output current I1 is of about more than ten, but less than twenty amperes, the output current Iηmax for achieving the maximum efficiency ηmax is of about several tens amperes, and an output current I6 in the vicinity of the greatest current is of a value lower than 100 amperes.

It should be noted that the efficiency η of the DC/DC converter 24 is in accordance with the characteristic curve 62, i.e., drops as the output current Idc increases in excess of at least the output current Iηmax.

If the efficiency η is smaller than the threshold efficiency ηth in step S4 (step S4: NO, η<ηth), the ECU 30 judges whether or not the output current Idc is equal to or greater than the output current Iηmax in step S5.

If Idc<Iηmax (step S5: NO), then since it is known that the output current Idc is of a value smaller than the output current I1 (Idc<I1) (η is equal to or greater than ηth between I1 and Iηmax), the output current Idc is of an extremely small value. Therefore, a process of controlling the auxiliary equipment load 20, to be described below, is not carried out, and control goes back to step S1.

If the output current Idc is equal to or greater than the output current Iηmax in step S5 (Idc≥Iηmax, step S5: YES), then since the output current Idc is of a relatively large value, the process of controlling the auxiliary equipment load 20 is carried out in step S6, charging the low-voltage electric storage device 22 quickly.

The process of controlling the auxiliary equipment load 20 in step S6 is a control process carried out by the ECU 30 to limit the input current Iu supplied to the general load 18. As shown in FIG. 3B, if the output current Idc is set to a large current as the output current I6, then the general load 18 is allowed to operate with the output current I6 for only an allowable time Tn of 10 seconds, for example, after which, as shown in FIG. 4, the input current Iu supplied to the general load 18 is reduced gradually or stepwise for a predetermined time Tdec until the direct current Idc becomes the output current Iηmax, thereby controlling the input current Iu to hold the output current Iηmax.

Similarly, if the output current Idc is an output current I5 in the process of controlling the auxiliary equipment load 20 in step S6, then the general load 18 is allowed to operate with the output current I5 for only one minute, after which, as shown in FIG. 4, the input current Iu is reduced gradually or stepwise until the direct current Idc becomes the output current Iηmax, thereby controlling the input current Iu to hold the output current Iηmax.

Since the DC voltage Vb is constant, the electric power consumed by the general load 18 is reduced by reducing the input current Iu, and the charging current Ib supplied to the low-voltage electric storage device 22 is increased accordingly. Therefore, the low-voltage electric storage device 22 can be charged quickly.

The general load 18 may be controlled to reduce the input current Iu for reducing the volume level of the audio system or lowering the rotational speed of a motor-operated compressor or an air-conditioner fan of the air conditioner. The priorities of units whose power consumption is to be reduced in the general load 18 are stored in advance in the ECU 30. It is preferable to reduce electric power consumed by only the general load 18, rather than the safety load 16, of the electric vehicle 10.

If the efficiency η of the DC/DC converter 24 is equal to or greater than the threshold efficiency ηth in step S4 (step S4: YES, η≥ηth), then the ECU 30 detects the temperature Tb of the low-voltage electric storage device 22 through the temperature sensor 56, and judges whether the detected temperature Tb is lower than a threshold temperature Tth, e.g., 40 [° 1C], or not in step S7.

Figure 5:
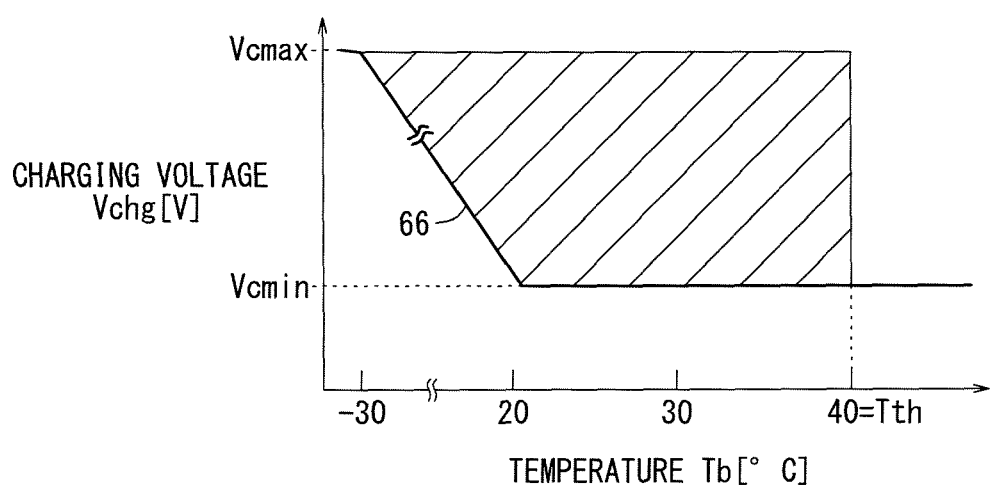
FIG. 5 is a diagram showing temperatures vs. charging voltages of a low-voltage electric storage device.

If the detected temperature Tb is equal to or higher than the threshold temperature Tth (step S7: NO, Tb≥Tth), then since it is impossible or quite difficult for the low-voltage electric storage device 22 to store electric energy, the ECU 30 instructs the ECU 46 of the DC/DC converter 24 to set the output voltage of the DC/DC converter 24, i.e., the voltage Vb of the low-voltage electric storage device 22, i.e., the charging voltage Vchg, to a minimum charging voltage Vcmin, e.g., 13.9 [V] or lower, in step S8 (Vb=VchgΘVcmin) in order to protect the low-voltage electric storage device 22, as shown in FIG. 5.

If the detected temperature Tb of the low-voltage electric storage device 22 is lower than the threshold temperature Tth in step S7 (step S7: YES, Tb<Tth), then since the low-voltage electric storage device 22 can be charged, the ECU 30 instructs the ECU 46 to set the output voltage of the DC/DC converter 24, i.e., the voltage Vb of the low-voltage electric storage device 22, i.e., the charging voltage Vchg, to a voltage in a range shown hatched between the minimum charging voltage Vcmin, e.g., 13.9 [V], and a maximum charging voltage Vcmax, e.g., 14.5 [V], depending on the SOC in step S9. In this manner, the output voltage of the DC/DC converter 24, i.e., the voltage Vb of the low-voltage electric storage device 22, i.e., the charging voltage Vchg, is set to promote the charging of (electric storage in) the low-voltage electric storage device 22.

The low-voltage electric storage device 22 is thus charged to keep the output current Idc of the DC/DC converter 24 in a range where the efficiency η is equal to or greater than the threshold efficiency ηth, as shown in FIG. 6A (which illustrates the characteristic curves 62, 64 shown in FIG. 3A) and FIG. 6B (which illustrates the charging voltage Vchg).

While the low-voltage electric storage device 22 is being continuously charged, the ECU 30 judges again in step S1 whether or not the SOC of the low-voltage electric storage device 22 is equal to or greater than the threshold value SOCth, e.g., indicates a fully charged state or a nearly fully charge state. If the SOC of the low-voltage electric storage device 22 is equal to or greater than the threshold value SOCth (step S1: YES), then the ECU 30 stops operating the DC/DC converter 24 in step S10. Subsequently, if the charger 50 is being connected to the external power supply 70 through charging plug 48, only the high-voltage electric storage device 14 is charged by the external power supply 70.

In above-described step S2, if it is judged that the DC/DC converter 24 is not operating (during non-operation, step S2: NO), the temperature Tb of the low-voltage electric storage device 22 is detected by the temperature sensor 56 in step S11. As described in the process of steps S7 to S9, based on the detected temperature Tb and the SOC detected in step S1, the output voltage of the DC/DC converter 24, i.e., the voltage Vb of the low-voltage electric storage device 22, i.e., the charging voltage Vchg is set (Vb=Vchg) in step S12, and the DC/DC converter 24 is activated in step S13. Then, the charging process in step S3 and subsequent steps are performed.

As described above, the electric vehicle 10 according to the present embodiment which has the electric motor 12 and the high-voltage electric storage device 14 for energizing at least the electric motor 12 comprises the low-voltage electric storage device 22 for energizing the auxiliary equipment load 20 of the electric vehicle 10, the DC/DC converter 24 connected between the high-voltage electric storage device 14 and the low-voltage electric storage device 22 and serving as a step-down device for lowering the voltage of the high-voltage electric storage device 14 to supply electric power to the low-voltage electric storage device 22, the auxiliary equipment load 20 connected to a low-voltage terminal of the DC/DC converter 24 and connected parallel to the low-voltage electric storage device 22, the current sensor 26 serving as an output current detector for detecting the output current Idc from the DC/DC converter 24, and the ECU 30 serving as a step-down device controller for controlling the electric power consumed by the general load 18 of the auxiliary equipment load 20 to control the output current Idc from the DC/DC converter 24 so that the efficiency η of the DC/DC converter 24 which is determined from the output current Idc will become equal to or greater than the threshold efficiency ηth as a prescribed efficiency.

According to the present embodiment, since the single DC/DC converter 24 is used to control the efficiency η thereof so that it will become equal to or greater than the threshold efficiency ηth as the prescribed efficiency. Therefore, the low-voltage electric storage device 22 can be charged highly efficiently from the external power supply 70 through the charger 50 or from the high-voltage electric storage device 14 with an inexpensive and simple arrangement.

As indicated by the characteristic curve 62, the efficiency η of the DC/DC converter 24 drops as the output current Idc thereof increases in the range of the output current Idc that is normally used. Therefore, as described above with reference to FIGS. 2, 3A, 3B, and 4, the ECU 30 controls the electric power consumed by the auxiliary equipment load 20 by energizing the general load 18 for a shorter period of time as the output current Idc increases, so that the DC/DC converter 24 can be used highly efficiently.

Furthermore, as described above with reference to FIGS. 5, 6A, and 6B, when efficiency η of the DC/DC converter 24 is equal to or greater than threshold efficiency ηth and the temperature Tb of the low-voltage electric storage device 22 is a temperature lower than the threshold temperature Tth which is a prescribed high temperature (prescribed temperature), the ECU 30 increases the output voltage of the DC/DC converter 24, i.e., the charging voltage Vchg (=Vb), as the temperature Tb of the low-voltage electric storage device 22 lowers, thereby charging the low-voltage electric storage device 22. Therefore, the low-voltage electric storage device 22 can be charged to an appropriate amount of electric energy depending on the temperature thereof.

When the charger 50 is operated to charge both the high-voltage electric storage device 14 and the low-voltage electric storage device 22 from the external power supply 70, the ECU 30 calculates the SOC which represents the amount of electric energy stored in the low-voltage electric storage device 22, and stops operating the DC/DC converter 24 when the calculated SOC becomes equal to or greater than the threshold value SOCth. Subsequently, the charger 50 can charge the high-voltage electric storage device 14 intensively.

The present invention is not limited to the above embodiment, but may adopt various arrangements based on the contents of the above description.

For example, the electric vehicle is not limited to an electric automobile, but may be a vehicle having an electric motor that is energized by a high-voltage electric storage device (a fuel cell device for a fuel cell vehicle, for example) and an auxiliary equipment load that is energized by a low-voltage electric storage device. Such a vehicle includes, e.g., a hybrid vehicle, a plug-in hybrid vehicle, a fuel cell vehicle, or the like.

What is claimed is:

1. An electric vehicle having an electric motor and a high-voltage electric storage device for energizing at least the electric motor, comprising:
   a low-voltage electric storage device for energizing a plurality of auxiliary equipment loads of the electric vehicle including a plurality of general loads and at least one safety load;
   a step-down device connected between the high-voltage electric storage device and the low-voltage electric storage device for lowering the voltage of the high-voltage electric storage device to supply electric power to the low-voltage electric storage device;
   the plurality of auxiliary equipment loads connected to a low-voltage terminal of the step-down device and connected parallel to the low-voltage electric storage device;
   an output current detector for detecting an output current from the step-down device; and
   a step-down device controller for reducing only the electric power consumed by the plurality of general loads in accordance with predetermined priorities for the plurality of general loads to control the output current from the step-down device so that efficiency of the step-down device which is determined from the output current will become equal to or greater than a prescribed efficiency.

2. The electric vehicle according to claim 1, wherein the efficiency of the step-down device has characteristics such that the efficiency drops as at least the output current from the step-down device increases; and
   the step-down device controller reduces the electric power consumed by the one of the general loads by energizing one of the general loads for a shorter period of time as the output current increases.

3. The electric vehicle according to claim 1, further comprising an electric storage device temperature detector for detecting a temperature of the low-voltage electric storage device;
   wherein the step-down device controller charges the low-voltage electric storage device by increasing an output voltage of the step-down device as the temperature of the low-voltage electric storage device lowers when the efficiency of the step-down device is equal to or greater than the prescribed efficiency and the temperature of the low-voltage electric storage device is lower than a prescribed temperature.

4. The electric vehicle according to claim 1, further comprising a charger connected between the high-voltage electric storage device and the step-down device, for charging both the high-voltage electric storage device and the low-voltage electric storage device from an external power supply;
   wherein the step-down device controller calculates an amount of electric energy stored in the low-voltage electric storage device and stops operating the step-down device when the calculated amount of electric energy is equal to or greater than a prescribed amount.

5. The electric vehicle according to claim 1, wherein the efficiency of the output current from the step-down device is equal to or greater than a prescribed efficiency in between a first value of the output current from the step-down device and a second value of the output current from the step-down device, the first value being lower than the second value, and
   wherein a maximum efficiency of the output current from the step-down device lies in between the first value and the second value.

* * * * *